United States Patent [19]

Tan et al.

[11] Patent Number: 5,327,172
[45] Date of Patent: Jul. 5, 1994

[54] POLLING FOR DETECTION OF POWER SUPPLY OR OTHER FAILURES OF A DIGITAL CIRCUIT

[75] Inventors: Siew M. Tan; Chon S. Oh, both of Singapore, Singapore

[73] Assignee: Thomson Consumer Electronics, S.A., Courbevoie, France

[21] Appl. No.: 873,950

[22] Filed: Apr. 23, 1992

[30] Foreign Application Priority Data

May 2, 1991 [GB] United Kingdom ................. 9109595

[51] Int. Cl.$^5$ .............................................. H04N 5/63
[52] U.S. Cl. ................... 348/378; 340/815.16; 371/66; 395/750; 455/343
[58] Field of Search ...................... 358/191.1, 190, 903; 315/411, 408; 455/343; 365/229; 395/750; 371/66; 364/707; 340/333, 825.16; H04N 5/63

[56] References Cited

U.S. PATENT DOCUMENTS

| | | | |
|---|---|---|---|
| 3,697,953 | 10/1972 | Schoenwitz | 340/825.16 |
| 4,224,684 | 9/1980 | Conner et al. | 395/750 |
| 4,387,399 | 6/1983 | Novotny | 358/190 |
| 4,656,399 | 4/1987 | Testin et al. | 315/411 |
| 4,663,539 | 5/1987 | Sharp et al. | 395/750 |
| 4,731,654 | 3/1988 | Itabashi et al. | 358/188 |
| 5,018,148 | 5/1991 | Patel et al. | 371/66 |
| 5,036,261 | 7/1991 | Testin | 315/411 |
| 5,144,441 | 9/1992 | Sparks et al. | 358/190 |
| 5,148,380 | 9/1992 | Lin et al. | 364/707 |
| 5,214,785 | 5/1993 | Fairweather | 364/707 |

Primary Examiner—James J. Groody
Assistant Examiner—Jeffrey S. Murrell
Attorney, Agent, or Firm—Joseph S. Tripoli; Joseph J. Laks; Francis A. Davenport

[57] ABSTRACT

A television receiver includes a standby power supply, and an operational or run mode power supply. A microprocessor coupled to the standby power supply controls switching between a run mode, where the standby and run mode power supplies are operative, and a standby mode where only the standby supply is operative. The switching is normally made in response to switch inputs or in response to a signal from a remote controller. The microprocessor is in digital communication with a digital circuit, such as a phase locking tuner, over a bidirectional data bus. The microprocessor is programmed to poll the digital circuit periodically and to monitor the data on the data bus for an expected response to a poll. When the digital circuit fails to respond to the poll, or responds inappropriately, as may occur with lack of adequate power to the digital circuit from the run power supply, the microprocessor automatically switches into the standby mode and disables the run supply. The microprocessor switches back into the run mode upon command, unless data stored in memory indicates a recent or repeated automatic change into the standby mode after a detected failure.

7 Claims, 5 Drawing Sheets

POLLING FOR DETECTION OF POWER SUPPLY OR OTHER FAILURES OF A DIGITAL CIRCUIT

This invention relates to the detection of a failure of a digital circuit connected to a data bus, and in particular, to successive device polling and response verification to identify a device failure state. The detection of a digital failure may result in a protective action to prevent possible damage to the digital circuit or the apparatus of which it is a part. In a television apparatus having both a standby power supply and an run or operational power supply, a failure of the run power supply is detected by monitoring the operational status of digital circuits powered from the run power supply. Detection of a failure causes the television apparatus to switch from the run to a standby mode.

BACKGROUND OF THE INVENTION

The detection of a malfunction in a digital system comprising a digital circuit connected to and communicating via a bus, may be evident by an incorrect or absent response to an interrogation request via the data bus. The malfunction may due to the failure of the digital device or failure of the power supply feeding the device. Detection of the failure may result in some form of protective action, to prevent the propagation of the erroneous state via the communication bus, and to cause the device and or system of which it is a part, to change from the current state to a protective condition.

A television receiver, or VCR, often contain multiple protection circuits which monitor various parameters and often provide protection by shutting down or turning off the power supply in the apparatus, or by placing the apparatus in a standby non-operational mode. Most protection systems employed in prior television receivers use electronic components to sense malfunctions and control the protective means. These components add complexity to the circuit design, introduce a potential for greater unreliability, and increase the material cost of the product. The object of this invention is the provision of a detection and protection method whereby failures of a power supply or digital circuit are detected without additional parts specific to failure detection.

It is known that television receivers may employ separate power supplies often termed a standby supply and a run or operational supply. The standby supply is active continuously whenever the apparatus is connected to an external AC mains supply. The standby supply powers systems which must remain active when the apparatus is turned off. Such systems are termed standby loads and may include the remote control receiver, the on/off switching means, digital clocks, volatile memory, and a digital processing means such as a microcomputer.

The run supply powers the operational or run loads which are only active when the apparatus is on. These run loads may include the tuner, IF amplification, synchronization and electron beam and scanning generation, video and audio processing etc.

In many instances, the television receiver will include standby and run power supplies. The standby power supply is connected to an AC mains supply, however, the run supplies are generated by rectification of horizontal frequency pulses coupled via a transformer in the collector of the horizontal output transistor. Any undue loading of the run supply, due to short circuit or component failure in one of the operational loads will be coupled, via the horizontal output transformer, to the other operational supplies. Thus, undue loading or failures in any run supply or operational load, will result in a reduction in the power supplies coupled to the other loads including digital circuitry of the tuner unit.

A microprocessor may be coupled to the standby power supply and control switching between a run mode wherein the standby and run power supplies are operative, and a standby mode wherein only the standby supply is operative. Mode switching may be originated manually by the user, via input switch selection or by remote control command, or automatically by the microprocessor sensing a fault condition. The microprocessor is in digital communication with a digital circuit such as a phase locking tuner, via a bidirectinal data bus.

SUMMARY OF THE INVENTION

An apparatus comprising a digital processor and at least one digital circuit where both are coupled to, and communicate bidirectionally, via a data bus. The digital processor communicates with the digital circuit and receives a reply which is verified in order to detect failure conditions. When failure conditions are detected the digital processor has control means to assume a protective operating mode, and also cause the television apparatus to change operating modes and assume a protective mode condition.

An inventive solution to power supply failure detection and protective or standby mode assumption is accomplished in a television receiver which utilizes properties inherent in the design without the use of additional components and or circuitry specific to power supply or component failure detection. The microprocessor is programmed to poll the digital circuit periodically and to monitor the data on the data bus for an expected response to a poll. When the digital circuit fails to respond to the poll, or responds inappropriately, as characteristically occurs with lack of adequate run supply power to the digital circuit, the microprocessor automatically switches into the standby mode and disables the run power supplies The microprocessor switches back into the run mode upon user command, unless data stored in memory indicates a recent or repeated automatic change into the standby mode after a detected failure.

DETAILED DESCRIPTION

Figure 1:
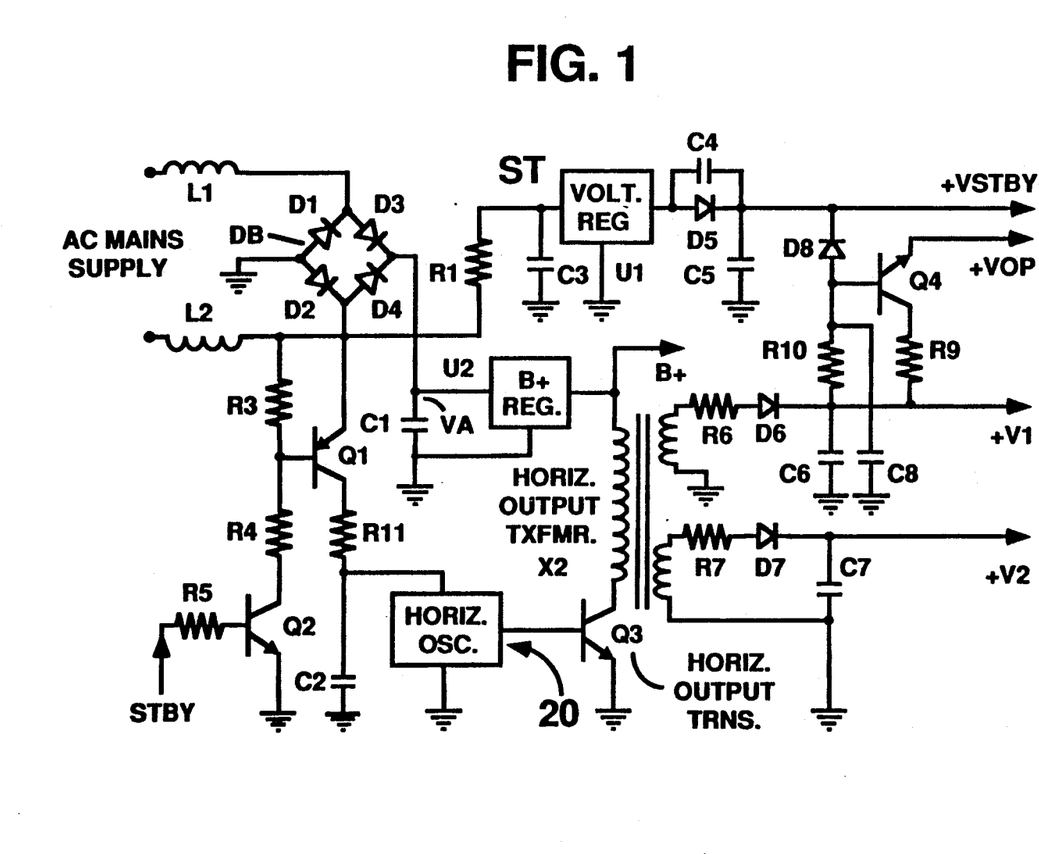
FIG. 1 is a block diagram of a power supply arrangement according to the invention.
Figure 2:
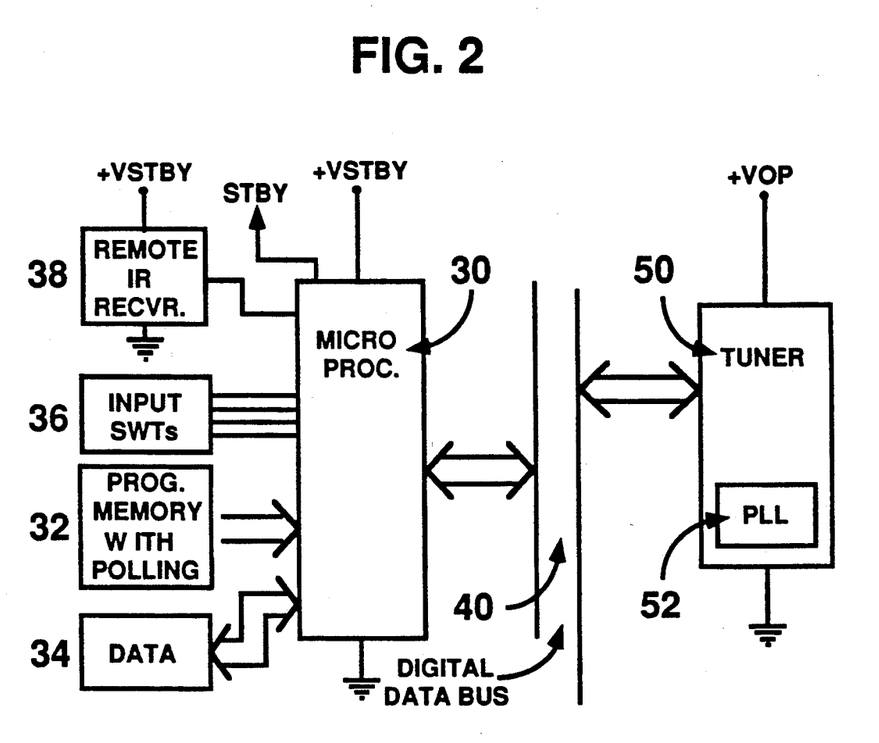
FIG. 2 is a block diagram of a microprocessor and data communication system according to the invention, powered by the power supply arrangement of FIG. 1.

FIGS. 1 and 2, show a television receiver, according to the invention, which has a number of power supplies driven directly or indirectly from the AC mains power supply. The AC mains supply is coupled via filtering inductors L1 and L2 to a diode bridge rectifier DB comprising diodes D1 through D4. The common anodes of diodes D1 and D2 are grounded and the common cathodes of diodes D3 and D4 are coupled to provide an unregulated full wave rectified positive voltage at point VA. For purposes of the invention, three outputs from bridge rectifier DB, are of particular interest. These three outputs feed a standby power supply ST, a B+ supply regulated by a regulator U2 which in turn supplies a horizontal output transistor Q3 and generates the run supplies, and a horizontal oscillator 20 coupled to the diode bridge via a transistor Q1.

The standby power supply ST is continuously active when ever the television receiver is connected to the AC mains supply. Diode bridge DB provides a half-wave rectified supply via a series dropping resistor R1 connected between the junction of diodes D2 and D4 and a filter capacitor C3. This supply is halfwave rectified by part of diode bridge DB and is regulated by a regulator U1. The output of regulator U1 is applied via a diode D5 to a filter capacitor C5 to develop standby voltage VSTBY. Capacitor, C4 in parallel with diode D5 provides high frequency bypass. The voltage at point VSTBY is the standby power supply voltage which supplies loads which are powered continuously whether or not the television receiver is operating to display audio/video program. These loads are termed the standby loads.

The standby loads include a remote control receiver 38, for example an infrared detector and amplifier, and a microprocessor controller 30, responsive to a remote receiver 38. Microprocessor 30 decodes input signals received at receiver 38 and provides the switching functions signalled from the remote control. Inasmuch as remote receiver 38 must remain ready to receive an externally generated signal to switch from the standby mode to the run mode, microprocessor 30 and remote receiver 38 are always powered. Microprocessor 30 also provides other switching functions which occur in the run mode, for example channel changes, muting and the like. An alternative input mechanism to that of remote receiver 38 is that of the control panel input switches 36, which preferably allow manual selection of at least some of the same functions as the remote control input.

The various run loads of the television apparatus are driven from outputs coupled to a horizontal output transformer or flyback transformer X2. Transformer X2 is shown schematically in FIG. 1, or may alternatively be an autotransformer with two or more windings in common. The primary winding of the horizontal output transformer X2 is coupled between the B+ DC supply, for example at about 104 VDC, and the collector of horizontal output transistor Q3. The unregulated DC voltage VA developed by bridge rectifier DB, is filtered by a capacitor C1, and applied to voltage regulator U2 which produces a regulated B+ voltage. The base terminal of horizontal output transistor Q3 is coupled to the output of horizontal oscillator 20, and in the run mode, horizontal output transistor Q3 draws current through the primary winding of horizontal output transformer X2 at the horizontal scanning frequency. The horizontal output transformer is also coupled to horizontal deflection coil windings, not shown in the figure.

The secondary windings of horizontal output transformer X2 include windings developing AC signals at the horizontal scanning rate for generation of various DC voltages, two being shown for purposes of illustration as voltages V1 and V2. The voltages developed are chosen for the particular needs by appropriate choice of the relative number of primary and secondary windings of transformer X2, to obtain the required AC voltage on the secondary windings, in known manner. Typical supply voltages range from a low voltage level (e.g., 5 VDC) appropriate for power supply to digital integrated circuits, up to very high voltages appropriate for the picture tube anode (e.g., 20 KV), with intermediate voltages provided for power to such loads as analog amplifiers (e.g., 9 VDC), the vertical output stage (e.g., 25 VDC), the kinescope drivers (e.g., 150 VDC), etc. These run power supplies are active only when the horizontal oscillator is operating and coupled to transistor Q3.

In FIG. 1, run voltage V2 is developed from a secondary winding of the horizontal output transformer X2. The secondary winding is coupled via a current limiting resistor R7 to a rectifier diode D7, and a filter capacitor C7. run voltage V1 is generated in a manner similar to that of V2, from another secondary winding of transformer X2 via a resistor R6, a diode D6 and a filter capacitor C6.

Run voltage V1 is coupled to a series voltage regulator including a transistor Q4. To provide current limitation and to reduce power dissipation in transistor Q4, the collector terminal is connected to voltage V1 via a series resistor R9. The base of transistor Q4 is coupled to voltage V1 through a resistor R10, and AC decoupled to ground by a capacitor C8. The base of transistor Q4 is also coupled to the standby supply VSTBY through a diode D8. The standby supply is always present unless physically disconnected from the AC mains supply. Therefore, in the run mode (i.e., when voltage V1 is present), the base of transistor Q4 is maintained at the level of VSTBY, plus the voltage drop across forward biased diode D8, about 0.7 volts. Taking into account the forward biased base emitter voltage drop of NPN transistor Q4 (also about 0.7 volts), the regulated voltage at VOP is substantially equal to the voltage of VSTBY. Thus, the standby power supply is used as the reference input to the series regulator transistor Q4. In an exemplary embodiment, VSTBY and VOP are at 5 VDC in the run mode.

The standby mode disables horizontal oscillator 20 which in turn removes horizontal frequency signals from the base of horizontal output transistor Q3. The absence of an input signal to transistor Q3 prevents the generation of horizontal scanning signals at transistor Q3 collector, and the production of rectified horizontal signals which power the run power supplies. Hence, in the standby mode, the run power supply outputs which include voltages V1, V2, etc. are not present, and voltage VOP is zero. Horizontal oscillator 20 is controlled by output STBY of microprocessor 30.

To initiate the standby mode, microprocessor 30 generates a STBY output signal which is coupled to the base of a switching transistor Q2 through a resistor R5. When STBY is high, transistor Q2 conducts through resistors R3 and R4, which are coupled to the AC mains supply through choke L2 and the diode bridge DB. Resistors R3 and R4 form a voltage divider, with the junction of resistors R3 and R4 coupled to the base of PNP transistor Q1. When transistor Q2 is turned on, the junction of resistors R3 and R4 is pulled towards ground, turning on transistor Q1. With transistor Q1 turned on, an enabling current is supplied to the horizontal oscillator 20 via series resistor R11 and filter capacitor C2. Thus, when the STBY signal is high the horizontal oscillator is enabled, and when the STBY signal is low the horizontal oscillator is disabled.

Figure 3:
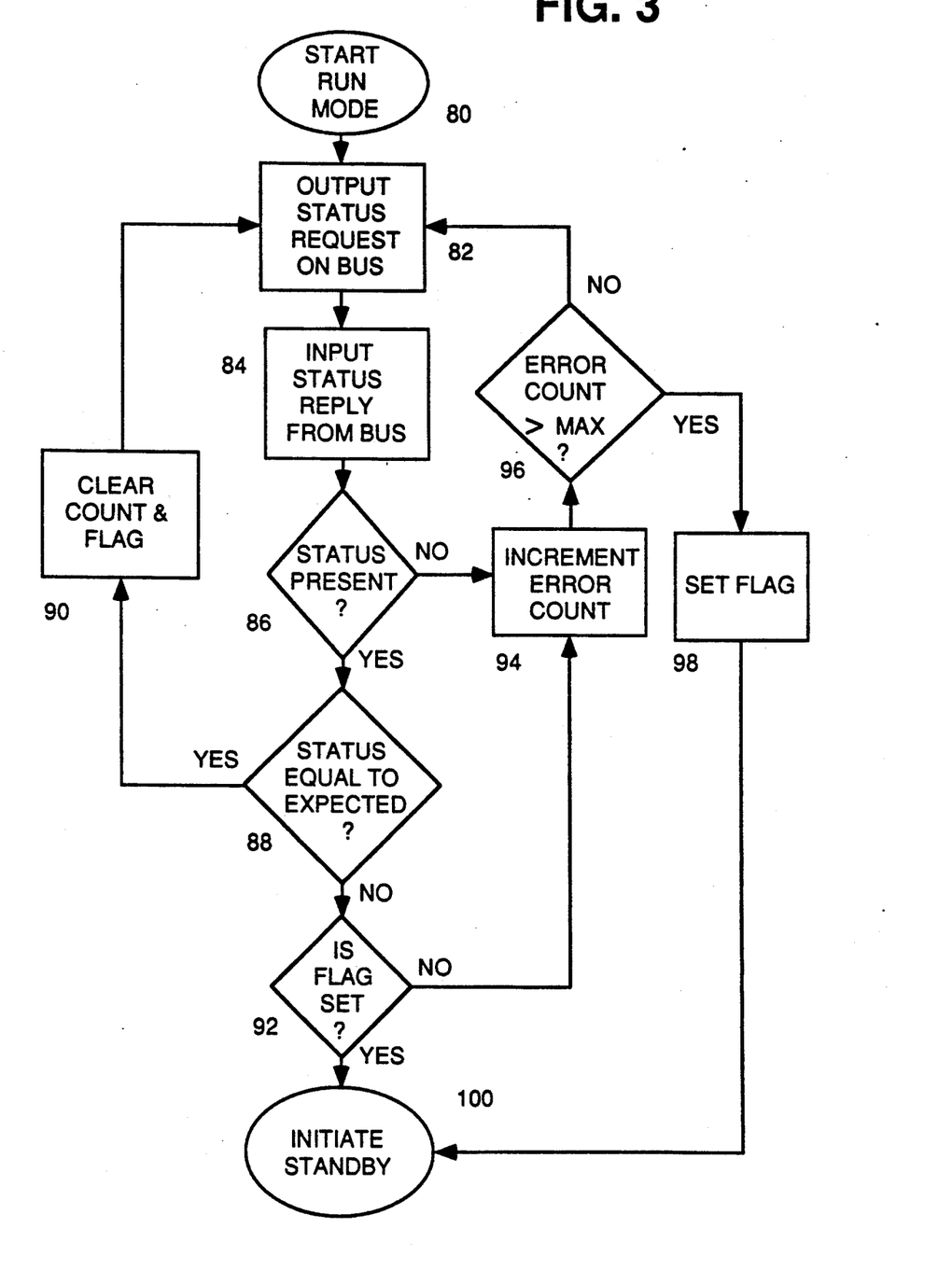
FIG. 3 is a flow chart showing operation of the microprocessor of FIG. 2.

In addition to executing user generated commands, i.e. ON/OFF, for switching between the run and standby modes, microprocessor 30 in the run mode, monitors communications with at least one digital circuit. In accordance with an inventive feature, the microprocessor in the event of detecting an inappropriate response or lack of response, automatically switches into a protective operating mode, for example, the standby mode. In FIG. 2, microprocessor 30 includes a data storage memory 34, and a program storage 32. The programing includes instructions to perform the device polling when AC power is first connected to the apparatus to establish the presence or absence of various optional accessories, for example Teletext decoding, or stereo audio demultiplexing etc. The programming also includes instructions to perform periodic device polling and response verification processing. FIG. 3 is a flow chart which indicates the polling, response verification and error count process. Microprocessor 30 is in bidirectional data communication with a digital circuit such as a tuner 50 via data bus 40. The data bus may be, for example, an Inter Integrated Circuit or I.I.C. two wire serial bus in accordance with Technical Publication No. 110 of Philips Export B.V. (1983), wherein a master device (microprocessor 30 according to the invention) outputs a data byte on the bus, including bits addressing a particular slave device coupled to the bus (i.e., tuner 50) during a write period, and inputs data from the slave device during a read period.

The bus is used in general for the microprocessor to send commands such as channel change commands to tuner 50, and for the tuner to acknowledge commands and indicate its status to the microprocessor. The tuner includes a phase lock loop oscillator 52, for tracking a frequency set by command from microprocessor and can indicate status conditions such as "seeking" or "locked," etc.

Microprocessor 30 is coupled to the standby supply VSTBY, and tuner 50 is coupled to one of the run supplies, VOP. In the event that one of the run loads coupled to the run supplies short circuits or otherwise draws excess current from the supply, this condition is reflected by a reduction in the power available at all the run supplies, due to loading of their common drive via the horizontal output transformer. In an overload condition, the voltage level of VOP falls. Since tuner 50 is a digital device, when the power supply VOP falls below a level sufficient to ensure operation of the digital circuits, the tuner will act anomalously or irregularly.

In a digital system communication via a bus, a malfunction may be evident by an incorrect or absent response to interrogation by the microprocessor, via the data bus. The malfunction may be detected by comparison of the actual devise response with an expected response. The malfunction may result from the failure of the digital device or be a consequence of a failure of the power supply feeding the device.

A particular consequence of low supply voltage to the tuner 50, is a failure to reply to a status request from the microprocessor, or to respond to the request with a status that is inconsistent with a command previously sent.

The program of microprocessor 30, advantageously includes coding to check for proper operation of tuner 50, and to automatically switch into the protection or standby mode in the event of a detected malfunction in the operation of the tuner. Switching into a protection or standby mode is appropriate regardless of the reason for the failure since failure of either the tuner or the run power supply will result in diminished or possibly zero entertainment value from the television apparatus.

With reference to the flow chart diagram of FIG. 3, upon initiating operation at entry point 80, microprocessor 30 at block 82 addresses tuner 50 by appropriate output data on bus 40, which is acknowledged by tuner 50. Tuner 50 can return data to the microprocessor including bits representing the present status of tuner 50.

At block 84, microprocessor 30 inputs the status information from the bus, if any. If no status indication is returned, microprocessor 30 at decision block 86 branches to block 94 and increments a count of the number of times the tuner 50 has failed to respond or has responded inappropriately. Similarly, at block 88 the status response from the tuner is compared to a known or standard valid response, also branching to the error path if the status indicates possible malfunction of tuner 50. Microprocessor 30 checks the incremented error count against a predetermined maximum number of errors, and if exceeded branches at block 96 to enter the standby mode. Before entering the standby mode the microprocessor sets a status flag at block 98, and enters the standby mode by changing the state of output STBY, thereby disabling the horizontal oscillator as discussed above.

The television receiver remains in the standby mode until the user inputs a command to enter the run mode from either input switches 36 or remote control via receiver 38. If tuner 50 is operating correctly, and outputs a status indication, and the status is valid, the flag indicator is cleared and periodic monitoring of the tuner over the data bus continues. When re-entering the run mode after microprocessor has switched automatically into the standby mode, the flag bit remains set. Should tuner 50 again reply to a status request with an invalid status or fail to reply, the microprocessor checks whether the flag bit is already set, and immediately returns to the protective standby mode.

Figure 4:
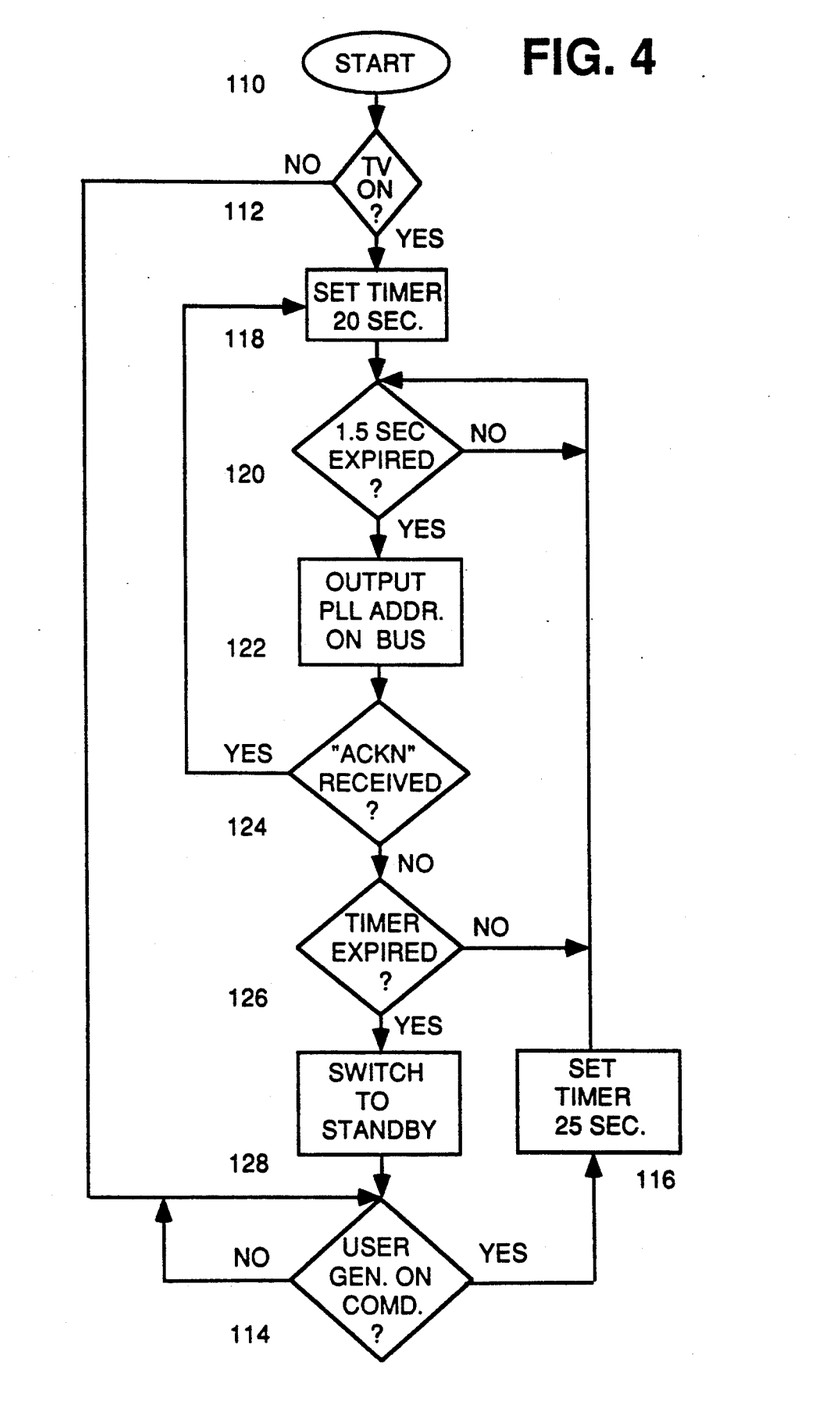
FIG. 4 is a flow chart illustrating a timed shutdown procedure wherein the timing of shutdown is varied upon occurrence of a previous shutdown.

Automatic switching from run mode to standby mode may be based upon timing as shown in the flow chart according to FIG. 4 rather than upon a predetermined number of missing or inappropriate status replies. Whereas the microprocessor is normally provided with a digital clock, timing may be monitored by the microprocessor, or separate counters coupled to the microprocessor clock, or one shot outputs, may monitor the passage of predetermined periods of time.

The flow chart of FIG. 4 illustrates a series of steps defining nested loops in the execution of the program of microprocessor 30, the program entering the loops through "Start" block 110. If the television receiver is in the standby mode, the program branches at decision block 112 to decision block 114, and remains in a loop until the user switches the television into the run mode via remote control receiver 38 or by switch inputs 36. When the user initially switches from standby to run mode, a maximum elapsed time timer is set a predetermined and relatively longer interval at block 116. This occurs during the initial pass through the monitoring loop by microprocessor 30, whether the standby mode was initiated by inputs from the user or automatically. The longer interval may be, for example, 25 seconds. The timer is allowed to count down while the microprocessor polls tuner 50 and phase locked loop (PLL) 52 for correct operation. In subsequent passes through the loop during correct operation, i.e., in situations where the television apparatus has not just been switched into the run mode from the standby mode, the timer is set at a shorter time interval, for example 20 seconds, at block 118.

The maximum elapsed time timer defines the interval in which the television receiver will be allowed to continue in the run mode without the microprocessor receiving a new valid status acknowledgement from tuner 50 and PLL 52. This maximum elapsed time is longer when the television receiver is first placed in the run mode, to allow start-up variations to stabilize.

While the television receiver is in the run mode, whether initially or in normal operation, the microprocessor idles in a loop at decision block 120 until an inquiry interval elapses, for example 1.5 seconds, then at block 122 outputs the address of tuner 50 and PLL 52 on the bidirectional data bus 40. If the expected acknowledgement is received, as shown at decision block 124, the program branches back to block 118, where the maximum elapsed time is reset to the shorter interval of 20 seconds at block 118. Provided the PLL 52 and tuner 50 remain operative, the program thus loops through blocks 118, 120, 122 and 124.

If power to the tuner 50 and PLL 52 falls below a minimum value due to overcurrent conditions, for example below 2.5 volts in a 5 volt digital circuit, the tuner and PLL fail to respond with an acknowledgement, and the program branches from block 124 to decision block 126. Decision block 126 tests for the maximum time to expire, and accordingly branches back to block 120 to continue to output successive status inquires on the bidirectional bus 40 every 1.5 seconds until the preset maximum time elapses. Should a valid status be received to any of the status inquires during the count down of the preset maximum time, the timer value is reset to 20 seconds. If no valid status is received, upon lapse of the preset maximum time (25 seconds initially or 20 seconds thereafter), the microprocessor switches the television apparatus into the standby mode at block 128, and commences a loop at block 114 until the user switches from standby to run mode.

An inventive feature is the provision for overcurrent protection in a convenient manner that makes use of the standby/run switching means and data communication paths present in the television apparatus. A number of variations are possible. For example, the microprocessor maybe programmed to permit initial invalid status indications from the tuner for a predetermined number of inquiry cycles before switching into the stanby mode, and the predetermined number used for the maximum error count can be a different number depending on whether occurrences of automatic switching to the standby mode have happened previously.

Tuner 50 is useful as the subject of error checking in the manner described due to its bidirectional communications with the microprocessor. Other digital circuits which operate incorrectly when the voltage supplied to them is reduced or when other types of interval failures occur could also be monitored to detect overcurrent conditions in the run power supply. It is also possible that other specific means for disabling the run power supply could be used instead of disabling the horizontal oscillator.

Figure 5:
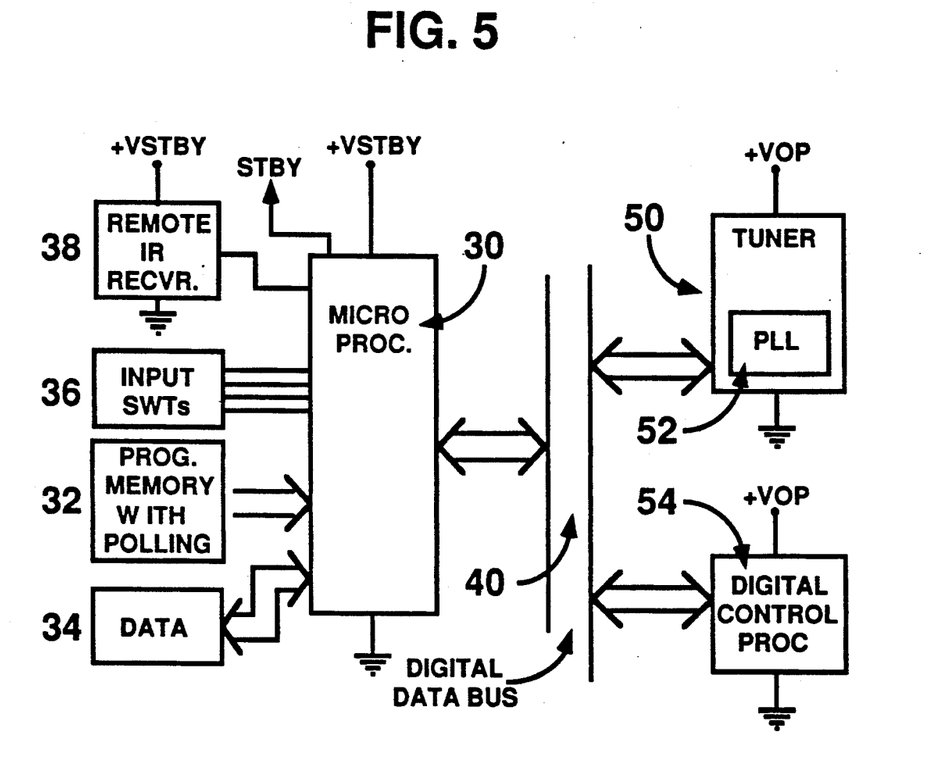
FIG. 5 is a block diagram of a microprocessor and data communication system according to another inventive embodiment.

FIG. 5 illustrates an inventive arrangement where a microprocessor 30 and a digital data bus system 40 communicate with more than one digital circuit. Items in FIGS. 2 and 5, similarly identified function similarly or represent similar quantities. In this system the microprocessor has additional programming which, in addition to failure detection, can assertain the likely cause of failure, this failure information being stored in non-volatile memory 34, for use by a service technician. In this failure diagnostic system, upon detecting a failure of a first digital circuit, for example the PLL 52, the microcomputer polls a second digital circuit 54, which for example, may be a digitally controlled audio processor, deflection digital control processor or "picture in picture" digital control processor. If the response from this second digital circuit is valid, the microcomputer concludes the failure is in the first digital circuit polled. A failed response to polling the second digital circuit is concluded to be indicative of a failure of the run power supply, as a consequence of an overcurrent condition in the run loads, rather than a multiple failure of the digital circuits.

What is claimed is:

1. An apparatus comprising:
   a digital circuit coupled to a power supply, said power supply providing power to a plurality of loads inclusive of said digital circuit;
   a data bus coupled to said digital circuit and operable to communicate data bidirectionally via said data bus; and
   a digital processor coupled to said power supply and to said data bus for supplying to said digital circuit, via said data bus, during a normal operating condition, a first plurality of digital command signals to cause said digital circuit to assume various normal operating modes, said digital circuit supplying on said data bus, during said normal operating condition, a second plurality of digital signals indicative of said various normal operating modes for monitoring by said digital processor to generate in response thereto said first plurality of digital command signals,
   wherein upon the occurrence of a failure operating condition, said digital circuit is incapable of supplying on said data bus any one of said second plurality of digital signals, and in the absence of any one of said second plurality of digital signals, said digital processor enters a protective mode of operation.

2. An apparatus according to claim 1, wherein the digital circuit is a tuner coupled to the data bus for bidirectional communications with the digital processor.

3. An apparatus according to claim 2, wherein the digital processor is operable to periodically poll the tuner over the data bus and the tuner is operable to reply to a poll by transmitting a status indication on the data bus, said failure condition being detected upon failure of the tuner to respond to the poll correctly.

4. An apparatus according to claim 3, wherein the failure condition is detected by lack of a response from the tuner for at least two successive polls.

5. An apparatus according to claim 1, wherein said power supply comprises a run power supply and a standby power supply, said digital circuit being coupled to the run power supply and the digital processor being coupled to the standby power supply.

6. An apparatus comprising:

a least two digital circuits coupled to a power supply, said power supply providing power to a plurality of loads inclusive of said digital circuits;

a data bus coupled to said digital circuits and operable to communicate data bidirectionally via said data bus; and a digital processor coupled to said data bus for communication with said digital circuits, and having means to control said digital circuits and at least another one of said plurality of loads according to a plurality of operating modes including a protective operating mode;

said digital processor being programmed to communicate sequentially with said digital circuits and monitor data on said data bus to verify data from each digital circuit to detect a failure condition, and upon detecting a failure of one digital circuit, said digital processor continues to communicate with the other digital circuit to verify the response therefrom, a detected failure of said one digital circuit being stored in a memory for identifying the failed digital circuit, and upon failure detection of the other digital circuit, said digital processor being programmed to identify said power supply as having failed and store such a failure identification in said memory, and having stored said failure identification, to assume said protective operating mode.

7. An apparatus comprising:

a power supply having a run power supply and a standby power supply;

a digital circuit coupled to said run power supply;

a data bus coupled to said digital circuit and operable to communicate data bidirectionally via said data bus; and a digital processor coupled to said standby power supply and coupled to said data bus for communication with said digital circuit, said digital processor having a plurality of operating modes including a protective operating mode, and having means to control said digital circuit and at least one other load powered by said power supply, said digital processor being programmed to monitor data on said data bus and to verify data from said digital circuit, wherein upon failure of said run power supply, said digital circuit fails to provide data to said data bus, and said digital processor detects said failure and assumes said protective operating mode.

* * * * *